US010482119B2

United States Patent
Kataria et al.

(10) Patent No.: US 10,482,119 B2
(45) Date of Patent: Nov. 19, 2019

(54) SYSTEM AND METHOD FOR CLASSIFICATION OF MICROBLOG POSTS BASED ON IDENTIFICATION OF TOPICS

(71) Applicant: Conduent Business Services, LLC, Dallas, TX (US)

(72) Inventors: Saurabh Kataria, Rochester, NY (US); Arvind Agarwal, Delhi (IN)

(73) Assignee: Conduent Business Services, LLC, Florham Park, NJ (US)

( * ) Notice: Subject to any disclaimer, the term of this patent is extended or adjusted under 35 U.S.C. 154(b) by 824 days.

(21) Appl. No.: 15/098,488

(22) Filed: Apr. 14, 2016

(65) Prior Publication Data
US 2017/0075991 A1    Mar. 16, 2017

Related U.S. Application Data

(60) Provisional application No. 62/218,188, filed on Sep. 14, 2015.

(51) Int. Cl.
*G06F 16/35*     (2019.01)
*G06N 7/00*      (2006.01)
(Continued)

(52) U.S. Cl.
CPC .......... *G06F 16/358* (2019.01); *G06F 16/337* (2019.01); *G06F 16/3322* (2019.01);
(Continued)

(58) Field of Classification Search
CPC .......... G06Q 30/0269; G06K 9/00469; G06N 99/005; G06N 20/00; G06N 7/005;
(Continued)

(56) References Cited

U.S. PATENT DOCUMENTS

2012/0041953 A1* 2/2012 Dumais ................. G06F 16/353
707/739
2012/0246097 A1* 9/2012 Jain ......................... G06F 16/35
706/12
(Continued)

OTHER PUBLICATIONS

Polatkan A.C., Nieselt, K, Collact.Me: Conecptual Framework for Extracting Domain-Specific Content from Twitter, Sep. 1, 2012, IEEE, Third International Conference on Cloud and Green Computing, pp. 313-319 (Year: 2013).*
(Continued)

*Primary Examiner* — James Trujillo
*Assistant Examiner* — Michal Lawrence Bogacki
(74) *Attorney, Agent, or Firm* — Fox Rothschild LLP

(57) ABSTRACT

A method for assigning a topic to a collection of microblog posts may include, by an acquisition module, receiving from at least one messaging service server, a plurality of posts, wherein each of the plurality of posts comprise post content; by a generation module, analyzing the posts and extract, from at least one of the posts, a link with an address to an external document; and, by the acquisition module, accessing the external document that is associated with the address and fetch external content associated with the document. The method may also include by the generation module: analyzing the post content to identify at least one label for each post, for each post that includes a link, analyzing the external content to identify a topic, and using a topic modeling technique to generate a trained topic model comprising a plurality of topics and a plurality of associated words.

18 Claims, 9 Drawing Sheets

(51) Int. Cl.
*G06N 20/00* (2019.01)
*G06F 16/955* (2019.01)
*G06F 16/335* (2019.01)
*G06F 16/332* (2019.01)
*G06F 16/9535* (2019.01)

(52) U.S. Cl.
CPC ...... *G06F 16/3329* (2019.01); *G06F 16/9535* (2019.01); *G06F 16/9558* (2019.01); *G06N 7/005* (2013.01); *G06N 20/00* (2019.01)

(58) Field of Classification Search
CPC .... G06F 16/951; G06F 16/367; G06F 16/353; G06F 16/954; G06F 16/35; G06F 16/285; G06F 16/93; G06F 16/9535; G06F 16/24578; G06F 16/3323; G06F 16/358; G06F 16/3322; G06F 16/337; G06F 16/3329
See application file for complete search history.

(56) References Cited

U.S. PATENT DOCUMENTS

| | | |
|---|---|---|
| 2013/0103667 A1 | 4/2013 | Minh |
| 2013/0151531 A1* | 6/2013 | Li .......................... G06Q 30/02 707/740 |
| 2013/0159236 A1* | 6/2013 | Vladislav ............ G06F 17/2785 706/46 |
| 2014/0114978 A1 | 4/2014 | Chatterjee et al. |
| 2014/0259157 A1 | 9/2014 | Toma et al. |
| 2015/0066904 A1* | 3/2015 | Asur ..................... G06F 16/951 707/722 |
| 2016/0371378 A1* | 12/2016 | Fan ........................ H04L 67/10 |

OTHER PUBLICATIONS

Yerva S.R. et al., Entity Disambiguation in Tweets leveraging User Social Profiles, Aug. 14-16, 2013, IEEE, 14th International Conference on Information Reuse & Integration, pp. 120-128 (Year: 2013).*

Hu X. et al., Topic Model-Based Micro-Blog User Interest Analysis, Jul. 1, 2014, IEEE, International Conference on Audio, Language and Image Processing, pp. 443-447 (Year: 2014).*

Hu B. et al., User Features and Social Network for Topic Modeling in Online Social Media, Aug. 1, 2012, IEEE, International Conference on Advnaces in Social Networks Analysis and Mining, pp. 202-208 (Year: 2012).*

* cited by examiner

| Label | Words |
|---|---|
| General 401(a) | browser site experience javascript cookies bbc page change enabled turn links requires style related view full date mobile weather loading video watch unavailable subscription category uploaded preferences license dec add sign youtube now working aug jan facebook twitter email share post blog site follow videos click sign account page contact news link free search media content find free make search back don time post home day book by holiday list books work amazon people found article 401(b) google app mobile apple web users company internet ipad phone social iphone online service apps android network data media music show film news movie photos album live star amp movies shows year top song tour songs rock pop week |
| Politics 402(a) | wikileaks obama assange news iran cables bbcworld president russia war world israel video nuclear guardian government china government news million business money year pay federal budget billion mayor trade city services financial companies chicago senate obama hours bill republicans democrats cuts vote president congress don deal republican repeal gop year cut sen israel palestinian israeli news case peace state gaza middle west jewish bank world jerusalem hamas tolds palestinians english 402(b) korea north south korea military china island attack war artillery yeonpyeogn seoul fire pyongyang peninsula drills lee states united security american america obama administration king washington holbrooke world threat saudi president foreign |
| enterta- internet culture 403(a) | video year news music john top time day man youtube star christmas watch show huffingtonpost today live film years love movie film man hollywood actor series director season films show role star movies melash production character cast story million year show viewers top film network harry potter cbs ratings night awards time office box oprah week black season 403(b) christmas video special holiday song son story time year love check show super music beautiful night subscription began news media journalism editor online twitter times wikileaks fox information social business community stories daily album music song video band singer hip hop songs track single artist pop amp love west record back movie release |
| disaster accident 404(a) | fire firefighters building house killed chicago injured blaze smoke scene home cnnbrk story city reported police water collapse bus bus news killed hospital accident driver mercury injured car volcano vehicle road police truck report airport india 404(b) mine rescue zealand coal explosion miners men trapped blast gas underground river dead police pike official Friday levels news earthquake quake people magnitude damage miles reported ruters city rian hit agency province south reports survey felt number year public health driving local years medical events school requo record don contract set percent deaths traffic found flight August airport people flights pope boeing airline Thursday month hours families passengers company power land united aug |
| education 405(a) | education students reading tests international percent countries schools scores study report results science average year math 405(b) fees tuition government universities vote students year university lib education clegg funding coalition party plans higher mps school district schools community students December program charter board area director los angeles members san ago made officials school review education books virginia tes book department errors state public history taught math December plans ponds standards million its tax taxpayers year wait file school deductions itemize ready income tuition delay includes filing form returns education language schools class school day classes french people teaching interest created students city foreign receive raquo account share |

FIG. 4A

| Label | Probability | Words |
|---|---|---|
| Human Interest | 0.287 | charity money yard electron bank vias plastic bbcworkd omgfacts peoplemag time russia year christmas |
| | 0.107 | webmd puerto rico cananobrein note doubt screwed hotel view earth cleck lauda parchment 401(b) |
| | 0.081 | kate cnnbak middleton price williams royal omgfacts prince william marry engagement wedding |
| | 0.05 | singfacts car details bbc world hero video cnnheroes jason peoplemag pollock descovery huffingtonpost named |
| Technology Internet | 0.410 | browser cc tiny check link url site please cookies login password account error codes try qr cache copy javascript 402(b) |
| | 0.291 | facebook mashable google apple valleylist video ipad iphone time wikileaks techcrunch app tech technologh social |
| | 0.047 | tempointerakti brie module chosemaid politik nieuwslijst choosevideoid sepakbola currentplaylist jason serarchurl |
| | 0.038 | daily today stories top read newpaper contributions contributed karl edubeat online wikileaks bundeliga nasa |
| Environment | 0.566 | print o psaquo stork liontish cost a weekends natgeosciety strawberries phosphorus pandas ab millet rica orphaned |
| | 0.062 | natgeosociety solar pictures probe photos venus space mars hurtling tonpost bbcworld climate system orbit earth |
| | 0.046 | climate cop change korea north nuclear science climatechange wikileaks green people guardianeco lose billion 403(b) |
| | 0.043 | birds sky fall dead arkansas chernobyl ukraine lift restrictions tourism around cnnbrk bbcworld yeay italy world |
| Social Issues | 0.353 | don ask gay tax tell repeal world senate cnnbrk time day aids bbcworld dadt act vote rights assange bill |
| | 0.072 | cnnbrk pope approve arixona black selllement farmers voters breaking news treasure senate condoms plan sucurity |
| | 0.061 | fojies allengany nantional state hill tioga bennett irish park trail along cuts rock crock sun beck code shot 404(b) |
| | 0.051 | playing pisel oject vaw lives least choler a health claimed out break women cnnbrk rape call duty bbcworld sunset |

FIG. 4B

SYSTEM AND METHOD FOR CLASSIFICATION OF MICROBLOG POSTS BASED ON IDENTIFICATION OF TOPICS

RELATED APPLICATIONS AND CLAIM OF PRIORITY

This patent document claims priority to U.S. Provisional Patent Application No. 62/218,188 filed Sep. 14, 2015. The disclosure of each of the priority applications are fully incorporated into this document by reference.

BACKGROUND

In recent years, web-based micro social behavior application platforms, such as microblogs, have emerged as a completely new interactive messaging environment. A blog is a regularly updated website, web page, or other messaging system in which posted messages may be viewed by subscribers and/or public at large. A microblog differs from a traditional blog in that its content is typically much smaller, in both actual size and aggregate file size. A typical microblog entry may be a short sentence fragment about what a person is doing at the moment or may be related to short comment on a specific topic. A microblog service enables users to send and receive short messages, which may include text, audios, images and/or videos, to and from a recipient or a group of recipients. In one instance, in the case of Twitter, the short messages are text-based messages of up to 140 characters, which are commonly known as "tweets." A user may act as a microblogger to issue messages related to any topic on his microblog, and may also act as a fan to remark on messages issued by other users on other users' microblogs.

However, an effective communication of the shared content heavily depends on its effective organization. This is particularly important for microblogging websites due to the diverse nature of the content shared. One possible solution to organize the real-time content is to classify it into topics of interest. However, such classification of microblogs poses several challenges. Posts are short (usually 140 characters or less), often with abbreviated terms or grammatical shortcuts, that differ from the language structure on which many supervised models in machine learning and natural language processors are trained and evaluated. Effectively modeling content on microblogs requires techniques that can readily adapt to the data at hand and require little supervision.

Existing topic detection methodologies are generally based on probabilistic language models, such as Probabilistic Latent Semantic Analysis (PLSA) and Latent Dirichlet Allocation. For example, latent variable topic models have been applied widely to problems in text modeling and require no manually constructed training data.

However, the existing models and classification techniques either use external linked content or explicit user profile information to generate the training models, and hence are not reliable. This is because, in the case of Twitter for example, only about 20-25% of tweets contain external links and many times user profile information is not available due to privacy settings. Furthermore, existing topic models typically need to know the number of topics of a document at the beginning of a training procedure utilized for training the topic models. This may have a drawback of making the topic model inflexible and difficult to determine the topics.

The current disclosure discloses a system and method to build supervised trained models for microblog classification that address the above limitations, and use of such models for automated microblog classification.

SUMMARY

In an embodiment, a method (and/or system) for assigning a topic to a collection of microblog posts may include receiving a plurality of posts, wherein each of the plurality of posts comprise post content from at least one messaging service server; analyzing the posts and extracting a link with an address to an external document from at least one of the posts; and causing a communications hardware component to initiate a communication via a communications network that accesses the external document at an external server that is associated with the address and fetches external content associated with the document. The method may also include by a generation module: analyzing the post content to identify at least one label for each post, for each post that includes a link, analyzing the external content to identify a topic, and using a topic modeling technique to generate a trained topic model, wherein the trained topic model comprises, for each identified label, a plurality of topics and a plurality of words associated with each of the plurality of topics. In an embodiment, the method may further include saving the trained topic model to a computer-readable memory device.

In certain embodiments, the method may also include receiving a new post associated with a user; and by a classifier module analyzing the new post by applying the trained topic model to a plurality of words in the unlabeled post, and generating a label for the new post. The method may include displaying the label, via a user interface.

In an embodiment, each of the plurality of posts may include a user identifier, and the method may include identifying and outputting one or more topics of interest for a single user by: identifying a set of posts associated with the single user using an associated user identifier for the single user, using the set of posts for generating a user-specific trained topic model such that the user-specific trained topic model is associated with the single user, and using the user-specific trained topic model for identifying and outputting the one or more topics of interest for a single user. In an embodiment, the method may also include updating the user-specific trained topic model for the single user after a pre-determined time.

In some embodiments, identifying the topic for each post also includes analyzing the content of the post to identify the topic.

In an embodiment, the topic modeling technique may include a User-Labeled Latent Dirichlet Allocation (uL-LDA) technique, that utilizes a user's interest variable vector to generate the trained topic model. Alternatively and/or additionally, the topic modeling technique may include a User-Labeled Hierarchical Dirichlet Process ($L^2$-HDP) technique, that utilizes a user's interest variable vector to generate the trained topic model. The user's interest variable vector may be indicative of a topic composition of the set of documents associated with the user. In at least one embodiment, the external document may include a plurality of labels, and the $L^2$-HDP analyzes the link if the plurality of labels includes at least one link label similar to the at least one label.

In some embodiments, the external document may include a plurality of labels, and the plurality of topics in the trained topic model may include a set of topics shared amongst the plurality of labels.

In an embodiment, the at least one label may be selected from one of the following labels: a hashtag label, an emoticon-specific label, an @user label, a reply label, or a question label.

BRIEF DESCRIPTION OF THE DRAWINGS

FIGS. 4A and 4B illustrate examples of the training topic models generated from the collection of posts and documents, using the ul-LDA and $L^2$-HDP models, respectively.

DETAILED DESCRIPTION

Figure 1:
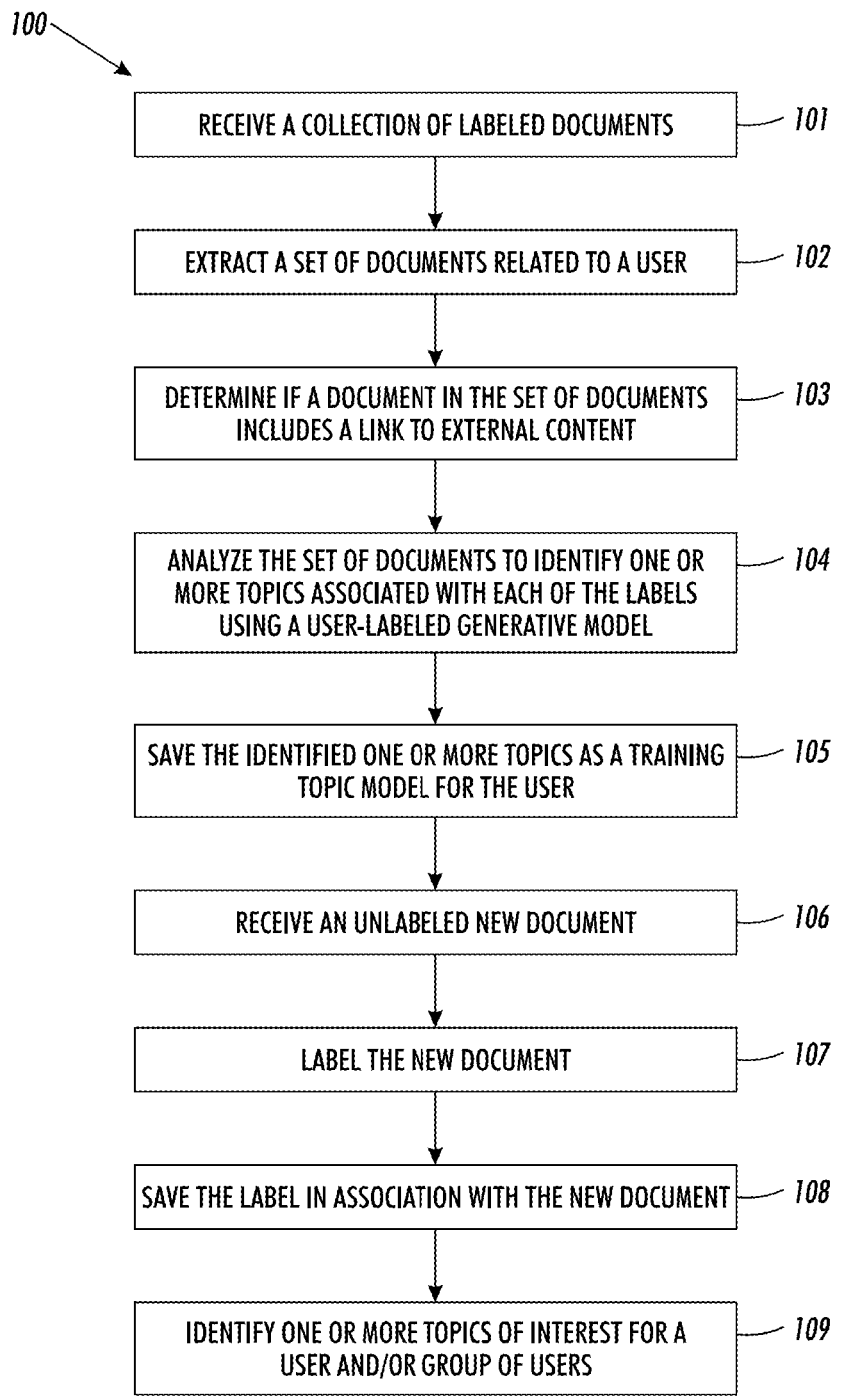
FIG. 1 depicts a flow chart example for building user-specific supervised trained models for microblog classification and the use of such models to classify unlabeled posts, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "electronic device" refers to a device or system that includes a processing device and non-transitory, computer-readable memory. The memory may contain programming instructions in the form of a software application (such as a generation module and/or classifier module, described below) that, when executed by the processor, causes the device to perform one or more topic modelling operations. Examples of suitable electronic devices include smartphones, personal digital assistants, cameras, tablet devices, electronic readers, personal computers, desktop computers, servers, and the like.

A "social networking service" is an on-line service, website, and/or platform to build social networks or social relations among people who share similar interests, activities, backgrounds or real-life connections. It enables each user to interact with other users so as to share ideas, activities, interests, etc. Often, social networking services enable a user to construct a representation of his/her persona (e.g., a "wall," profile, "timeline," etc.) that is made visible to some or all of the other users of the service, and that may be employed to communicate reflections, thoughts, interests, etc. Many social networking services also provide a platform through which users may interact, such as via messaging, e-mail, and/or other forms of interaction. Relationships between users of social networking services may be formed and/or fostered through the use of these and other features, such that each user maybe connected to other users by one or more specific types of interdependencies. Examples of such interdependencies include friendship, professional profiles, financial exchange, common interest, kinship, relationships, beliefs, knowledge, prestige, dislike, or sexual relationships. Relationships between social networking service users may take any of numerous forms. As examples, the Twitter social networking service allows one user to "follow" (i.e., receive all of the "tweets" sent by) another user, and the Facebook service enables one user to "friend" (i.e., receive all of the posts made by) another user. Some current examples of social networking services may include Facebook, LinkedIn, Twitter, Yelp, Orkut, Google's Social Circle, Instagram, Pinterest, MySpace, etc. While the current disclosure uses social networking services on a website as an example, it will be understood to those skilled in the art that the principles disclosed in this document may be applied to social networking services that may run on other platforms such as mobile application like WhatsApp, SnapChat, etc., gaming applications, or the like.

As used herein, the term "microblog service" refers to a type of messaging service or web publishing system in which user posts are published and made available to the public or to authorized other users, either via a messaging server (such as via a web page) or delivered via a post delivery service (such as an RSS feed delivery service). Microblog posts may be severely constrained in size. For example, Twitter is a microblog service that limits posts to no more than 140 characters. Other examples of microblogging systems and/or services include those known by the trademarks TUMBLR, PLURK, EMOTE.IN, SQUEELR, BEEING, and JAIKU. Certain social networking websites such as those known by the trademarks FACEBOOK, MYSPACE, LINKEDIN and XING also provide a microblogging feature, which is sometimes referred to as "status updates."

A "post" refers to a single publication by a user on a microblog or other public messaging service, which in turn refers to any socially compact broadcasted form of expression such as messages, micro-posts or tweets (i.e., having a limited number of word, expressions, etc.). Examples of posts may include, without limitation, electronic messages, personal status updates, blog entries, micro-blogging posts (e.g., tweets and/or other status updates associated with Twitter, status updates associated with Google Buzz, status updates associated with Facebook, Sina Weibo feeds, Tencent WeChat feeds, etc.), news headlines, news articles, text, images, audio, video, links, and/or other content items. Languages supported may include, for example, English, traditional/simplified Chinese, French, German, Italian, Spanish, Japanese, Korean, Indonesian, Thai, Vietnamese, Malay, Russian, Portuguese, Turkish, Polish, and Hindi. Posts are not limited to the social website environment and can also comprise other forms of user generated content (UGC) such as: a post on a social networking site; a comment on a news article; a comment or a post on a forum; a comment on a social networking site; and/or a mobile service instant message (e.g., a WhatsApp message). A collection of posts is referred to as a "corpus."

A "linked document" refers to an external document linked from within a post on a microblog service, such as via a hyperlink.

"Hashtags" refer to a word or a phrase prefixed with a hash symbol, "#", where there is no space between the hashtag and the associated word or phrases. Short messages on microblogging and social networking services such as Twitter or Instagram may be tagged by putting "#" before a selected word or words, such as when the word appears in a sentence.

It should be appreciated that, although the systems and methods as described herein incorporate the use of Twitter and data thereof, using other available social media data and platforms is envisioned, either singularly or in combination with Twitter. As used herein, a "tweet" can be any data (e.g., comments, links, etc.) posted by a Twitter user via the Twitter platform or associated applications or plug-ins, although other messaging services can be used.

FIG. 1 discloses a method 100 for modeling labeled posts and using the training topic model for labeling new posts, according to an embodiment. In an embodiment, the generation module may detect an explicit and/or implicit initial label which is pre-assigned to a post (e.g., using a hashtag), for instance by the author of the post. The raw electronic text in the post is then analyzed using a topic modelling technique to generate a trained topic model. The trained topic model may identify latent or hidden topics that fit the observed distribution of words (i.e., content) in the labeled posts and linked external content (if available), where each topic is a multinomial distribution over words V that tend to co-occur with each other and some topical label $c \varepsilon C$ such as politics, sports, etc. The trained topic model may also include user interest for a collection of labeled posts for a particular user. The classifier module may then apply the trained topic model to a new post by the user to classify it by assigning a label to the new post.

A topic modelling technique typically uses graphical models, such as Latent Dirichlet Allocation (LDA), Labeled LDA, Partially Labeled LDA (PLDA), and/or Hierarchical Dirichlet Process (HDP) to attempt to find latent or hidden topics in the text of a document, as well as to associate words with each of the latent topics. Other topic modelling techniques which may be employed by embodiments of the invention may include, without limitation, latent semantic analysis, probabilistic latent semantic analysis, Gibbs sampling, and naive Bayesian classification.

Traditional LDA is an unsupervised model that discovers latent structure in a collection of documents by representing each document as a mixture of latent topics. Each topic is itself represented as a distribution of words that tend to co-occur. LDA is an example of a generative topic model and allows sets of observations (documents, messages, posts) to be explained by unobserved groups (topics) that explain why some parts of the data are similar. In LDA, each document may be viewed as a mixture of various topics, and each topic is characterized by a distribution over words, with the assumption that such mixture or topic distribution has a Dirichlet prior. The LDA technique can be used to discover large-scale trends in language usage (what words end up together in topics) as well as to represent documents in a low-dimensional topic space. The Labeled LDA technique is an extension of traditional LDA that incorporates supervision by incorporating supervision in the form of implied microblog-level labels where available. This enables explicit models of text content associated with labels. In the context of microblogs, these labels include things such as hashtags, replies, emoticons, and the like. Labeled LDA technique allows the freedom of introducing labels that apply to only some subsets of documents so that the model can learn sets of words that go with particular labels.

Referring back to FIG. 1, the method 100 may include using an acquisition module to receive 101 a collection of posts. The acquisition module may fetch the collection of posts over a communications network such as the Internet from a plurality of social networking and/or microblogging sites. The acquisition module may fetch posts in an active manner, such as by scanning and extracting posts as published on websites, or in a passive manner such as by receiving posts through a feed delivery service such as may be the case with RSS feeds. Additionally and/or alternatively, some or all of the collection of posts may be locally accessible to the system from, for example, the cached history of a user's activities over a plurality of social networking and/or microblogging sites. The posts include one or more labels that generally classify the content to which the posts relate. Alternatively, the system may process the posts to identify labels and associate one or more labels with each post as described below. In an embodiment, the locally accessible collection may also include user activity logs relating to user messages (posts) on mobile messaging systems such as WhatsApp, SnapChat, and the like.

In an embodiment, a collection of labeled posts $\{T_t\}$ is indexed by t, each post containing a bag of words $N_t$ from a vocabulary of V and a label $c_t$ from a space of labels C.

In an embodiment, the collection of posts may also include a subset of posts with links to external textual content such as news articles, other blog posts or other linked documents). The generation module may assume that the label of the external linked document is same as the label of post that the link is embedded in.

The generation module may identify one or more labels, automatically and/or through input from the user. In an embodiment, a set of potential labels may be provided by the users and/or stored in a computer-readable memory as a data structure. Alternatively, one or more labels may be included in the posts themselves. The labels may help quantify or classify broad trends and help uncover specific, smaller trends such that labels are generic topics of interest, e.g. politics, sports, entertainment, etc. For example, one label is the hashtag label. A hashtag is a microblog convention that is used to simplify search, indexing, and trend discovery. Users include specially-designed terms that start with "#" into the body of each post. For example, a post about a job listing might contain the term "#jobs." Treating each hashtag as a label applied only to the posts that contain it allows the discovery of words that are uniquely associated with each hashtag.

Several others types of labels may be used to label the data prior to processing. In particular, emoticon-specific labels can be applied to posts that use any of a set of nine canonical emoticons: smile, frown, wink, big grin, tongue, heart, surprise, awkward, and confused. Canonical variations may be collapsed (for example, -] and :-) are mapped to:)). The @user labels can be applied to posts that address any user as the first word in the post. Question labels can be applied to posts that contain a question mark character. Because the emoticons, @user, reply, and question labels are relatively common, each of these labels may be factored into sub-variants (such as ":)-0" through ":)-9") in order to model natural variation in how each label is used.

The above examples of labels are provided by way of example only and other types and formats of labels are within the scope of this disclosure.

In step 102, a set of posts for a user $(D_u)$ is extracted from the collection of posts for training a topic model for the user. Each post in the collection of posts may have an author assigned (via a user identifier) and posts corresponding to a user $u \in \{1, \ldots, U\}$ form a set $D_u$.

In step 103, the generation module may determine whether or not a post in the set of posts includes a link to external content (i.e., linked documents). In an embodiment, a post may include more than one link. A link to external content may be in the form of a uniform resource locator ("URL"), a hyperlink, a thumbnail, or other similar links. External content refers to data and/or documents related to the post but outside of the post such as, for example, from websites, blogs, news media, multi-media, posts/links from other users, particular elements within the external content, or other similar sources of information. The generation module may use different algorithms for identifying topics associated with posts that do not include a link to external content and for identifying topics associated with posts that include a link to external content, as discussed below.

In step 104, the generation module may analyze the set of posts ($D_u$) to generate and/or identify one or more topics associated with each of the labels using a user-labeled generative model. The user-labeled generative model assumes that a user's interests do not change frequently and hence may be used to predict a label for her posts, and models user level topic training models that implicitly capture the user's interests over both topics and labels which aid in classification tasks. The system may identify topics based on content of the posts, content of the documents that are linked by the posts, or a combination of the two.

In one embodiment, a novel user-labeled LDA model is presented, in which each word is generated via a mixture of topics corresponding to a label, where the topics and labels can be generated based on the user's preference over labels and topics in a collection of posts.

In an embodiment, User-Labeled-LDA (uL-LDA) is an example generative model for a collection of labeled posts and is an extension of LDA and Labeled LDA to incorporate modeling of labels, links content and user's latent topics. Mathematically, uL-LDA assumes the existence of a set of C labels (indexed by $c \in \{1, \ldots, C\}$), each of which has been assigned some number of topics $K_c$ (indexed by $k \in \{1, 2, \ldots, K_c\}$) and where each topic $\varphi_{c,k}$ is represented as a multinomial distribution over all terms in the vocabulary V drawn from a symmetric Dirichlet prior $\beta$. Each user u contains both her label multinomial(mixture) variable $c_u$ (a vector of dimensionality C) and her topic multinomial variable, $\theta u$ which have Dirichlet hyperparameters, i.e. $\lambda$ and $\alpha^u$ respectively. In an embodiment, label mixture variable, $c_u$, indicates users preference over labels in the collection of posts, i.e., her interest in the type of content that she posts about. Also, users have label-specific topic mixture variable, $\theta_{cu}$ that indicates users topic composition of user's posts.

Topic modelling is performed on microblogs automatically or in a semi-supervised manner. Microblogs are usually very short (e.g. up to 140 characters), and hence the model assumes that each microblog post is generated using only one latent topic. The assumption means that users tend not to mix various topics in a single post, and hence topics are learned from user level word co-occurrences as opposed to post level word co-occurrences.

Figure 2A:
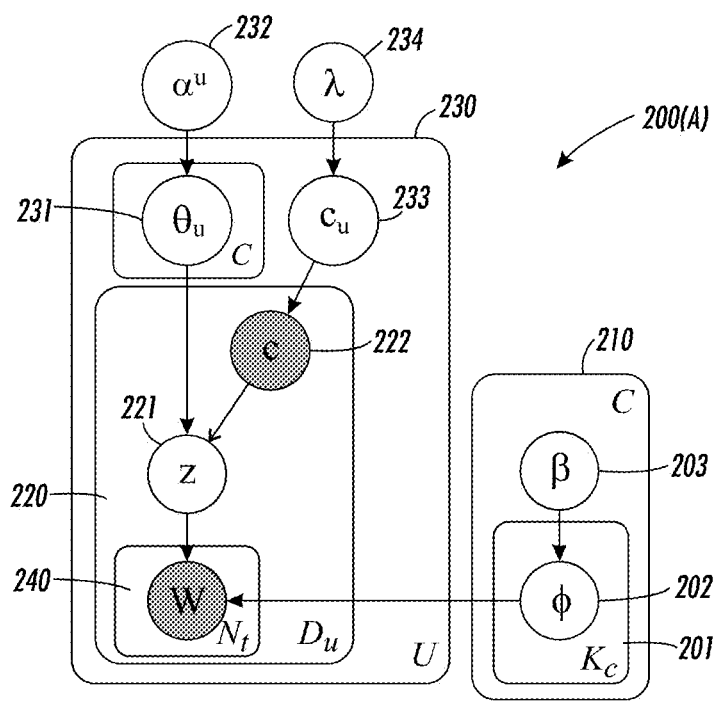
FIGS. 2A and 2B illustrate Bayesian graphical models and generative processes for embodiments of the ul-LDA model, according to an embodiment.

FIG. 2A illustrates a Bayesian graphical model and generative process for embodiments of the uL-LDA model $200(a)$. In particular, referring to FIG. 2A, for each topic $K_c$ 201 (in a C label number of repetitions 210), a multinomial distribution ($p_{c,k}$ 202 is drawn from a symmetric Dirichlet prior $\beta$ 203. Next, for each post $D_u$ 220 belonging to a user U 230, the following is performed. First, for each user U, a topic distribution $\theta_u$ 231 is obtained by sampling Dirichlet hyperparameter $\alpha^u$ 232. Second, for each user U, a label mixture variable $c_u$ 233 is drawn from a symmetric Dirichlet prior $\lambda$ 234.

Next, for each word position w 240 in the post $D_u$ 220, the following is performed. First, a topic z 221 is drawn from the label multinomial distribution $\theta_u$ 231, corresponding to a label c 222 of the label mixture variable $c_u$ 233. Second, a word is drawn from the word multinomial distribution $\varphi_{c,k}$ 202. Thus, this generative process assumption and approximate inference algorithm is used to reconstruct the per-post distributions over topics and the per-topic (and therefore per-label) distributions over words, starting from only the posts themselves, by analyzing the joint likelihood of the observed words w with the unobserved label and topic assignments, c and z, respectively.

$$P(w,z,c|\lambda,\beta,\alpha^u) = \int_\Psi P(w|z,c) \cdot P(z,c|\lambda,\beta,\alpha^u) d\Psi \quad (1)$$

Equation 1 may be used to analyze the joint likelihood of the observed words w with the unobserved label and topic assignments, c and z, respectively. Here, the bold face for variables denote a bag of variables for locations in corpus (collection of posts).

$\Psi$ represents the full set (users and topics) of collapsed parameters, i.e. $\Psi = \{\theta, \phi, c_u\}$.

In an embodiment, the generation module may use a collapsed Gibbs sampler to derive a sampling scheme to infer topic assignments and derive updates for the hyperparameters, as discussed below.

It should be noted that the left term in equation 1 is similar to standard LDA with the difference that a single topic will generate words in a post, i.e.

$$P(w|z) = \Pi_u^U \Pi_t^{D_u} \Pi_i^{N_t} P(w_i|z_t) \quad (2)$$

$$P(z,c|c_u,\lambda,\alpha^u) = \Pi_u^U \Pi_t^{D_u} P(z_t|c_t,\alpha^u) \cdot P(c_t|c_u,\lambda) \quad (3)$$

Combining (2) and (3):

$$P(w,z,c|\Psi) = \Pi_u^U \Pi_t^{D_u} (\theta_{u,c,k})^{n_{u,c,k}} \cdots (\phi c,k)^{n_{u,c} \cdots v} \quad (4)$$

where, $n_{u,c,k,v}$=number of occurrences of word v with topic $k \in \{1 \ldots K_c\}$ that belongs to label c in user u's posts. And, notation, "." represents sum of the counts, i.e. $n_{u,c,k,\cdot} = \Sigma_v n_{u,c,k,v}$ indicates count of all the words that are observed with topic k that belongs to label c in user u's posts.

After integrating $\Psi$ in equation (1), Bayes rule may be applied to obtain following Gibbs update:

$$p(c_t = c, z_t = k | z_{\neg t}, c_{\neg t}, w_t, \Psi) \propto \quad (5)$$

$$(n_{u,c,k,\cdot}^u + \alpha_u) \cdot \frac{(n_{u,c,\cdot,\cdot}^{-(u,t)} + \lambda)}{(n_{u,\cdot,\cdot,\cdot}^{-(u,t)} + C.\lambda)} \cdot \prod_{i \in N_t} \frac{n_{u,c,k,v}^{-(u,t)} + \beta}{n_{u,c,k,\cdot}^{-(u,t)} + V.\beta}$$

where, $\neg i$ indicates that $i^{th}$ variable from aggregate counts is left out. Next, we describe how we extend our models to incorporate content of linked posts.

The above described algorithm is used for identifying topics and word distribution in labeled posts that do not include a link to external content. For posts that include a link to external content, in an embodiment, the above algorithm may be modified as discussed below.

Links to external content may indicate a user's strong interest towards the topic(s) contained in the linked documents.

For a collection of linked documents, mathematically, User-Labeled-LDA assumes the existence of a set of C labels (indexed by $c \in \{1, 2, \ldots, C\}$), each of which has been assigned some number of topics $K_c$ (indexed by $k \in \{1, 2 \ldots, K_c\}$) and where each topic $\phi_{c,k}$ is represented as a multinomial distribution over all terms in the vocabulary V drawn from a symmetric Dirichlet prior $\beta$. In addition to label specific topics, the model also defines a set of topics $K_g$ that are shared among all the classes. Hence, each linked document contains both its label-specific topics as well as general class of shared topics to generate words in the document. Therefore, the total number of parameters, in the uL-LDA for linked documents, increases to $\Sigma_c K_c + K_g$ which may be reflected as C+1 repetitions of topic parameters in FIG. 2B. To allow for flexibility of modeling both the shared topics and label-specific topics, the model defines a new Bernoulli parameter s for each word token in linked documents. For each linked document, two types of topic mixtures $\theta^l$ that mixes shared type of topics and $\theta^g$ that mixes label-specific type of topics is defined. Depending upon the outcome of variable s, the word is either generated by path of shared topics in document (corresponding to s==0) or by path of label-specific topics (corresponding to s==1).

The explicit representation of shared topics among all classes is helpful in explaining the general content of the linked document whereas the exclusive set of label-specific topics is helpful for explaining individual labels. Note, that the model only uses the shared topic distribution for modeling linked documents.

Figure 2B:
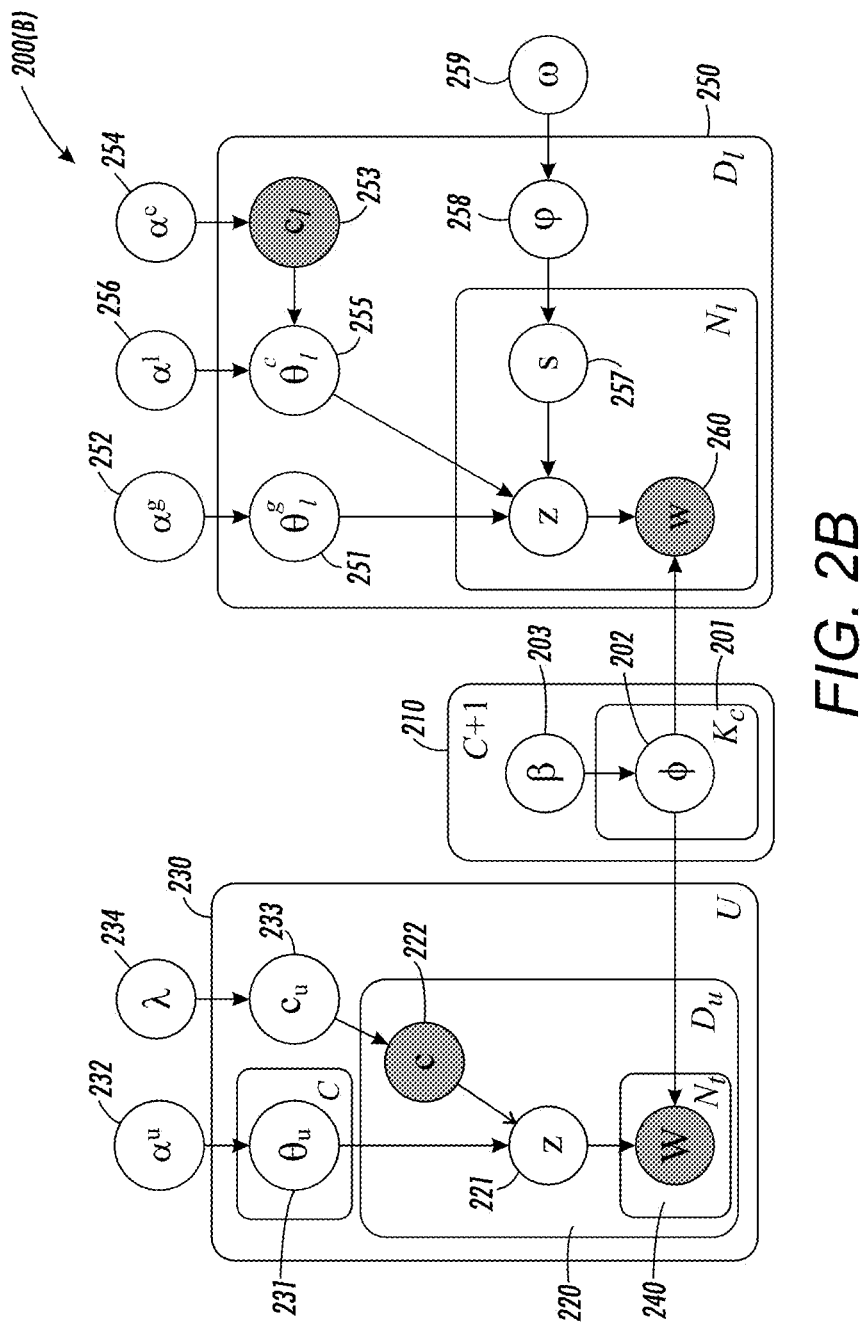

FIG. 2B illustrates a Bayesian graphical model and generative process for embodiments of the uL-LDA model 200(*b*) for identifying shared and label-specific topics in linked documents and corresponding posts containing links to the linked documents. In particular, referring to FIG. 2B, for each topic $K_c$ 201 (in C+1 label number of repetitions 210), a multinomial distribution $\phi_{c,k}$ 202 is drawn from a symmetric Dirichlet prior $\beta$ 203. Next, for each post $D_u$ 220 belonging to a user U 230, the following is performed. First, for each user U, a topic distribution $\theta_u$ 231 is obtained by sampling Dirichlet hyperparameter $\alpha^u$ 232. Second, for each user U, a label mixture variable $c_u$ 233 is sampled using Dirichlet hyperparameter $\lambda$ 234.

Next, for each word position w 240 in the post $D_u$ 220, the following is performed. First, a topic z 221 is drawn from the label multinomial distribution $\theta_u$ 231, corresponding to a label c 222 a label mixture variable $c_u$ 233. Second, a word is drawn from the word multinomial distribution $\phi_{c,k}$ 202.

Furthermore, for each linked document $D_l$ 250, a shared topic distribution $\theta^g_l$ 251 is drawn from a symmetric Dirichlet prior $\alpha^g$ 252. A label set $c_l$ 253 is also built that describes the linked document from a Dirichlet hyperparameter $\alpha^c$ 254, and a label-specific topic distribution $\theta^c_l$ 255, selected over the label set $c_l$ 253, is obtained by sampling a Dirichlet hyperparameter $\alpha^l$ 256. A parameter s 257 for each word token in linked documents is sampled as variable $s_i$ at location i in each document $D_l$ using document specific Bernoulli parameter $\phi_l$ 258 which, in turn, has a Beta hyperparameter $\omega$ 259.

Next, for each word position w 260 in the document $D_l$ 250, the following is performed. Sampling is done to obtain whether Bernoulli parameter s is a shared topic (s–0) or a label-specific topic (s==1) based on distribution $s_i$. If it is an shared topic (s==0), then a topic is obtained by sampling from the shared path. Specifically, a topic z 271 is drawn from the label multinomial distribution $\theta^g_l$ 251, and a word is drawn from the word multinomial distribution $\phi_{c,k}$ 202. However, if it is an label-specific topic (s==1), then a topic is obtained by sampling from the label-specific path. Specifically, a topic z 271 is drawn from the label multinomial distribution $\theta^c_l$ 255, and a word is drawn from the word multinomial distribution $\phi_{c,k}$ 202.

$$P(w, z, c_1, s | \beta, \alpha^u, \alpha^g, \alpha^c, \omega) = \int_\Psi P(w|z) \cdot P(z, c_1, s, | \beta, \alpha^u, \alpha^g, \alpha^c, \omega) d\Psi \quad (6)$$

Equation 6 may be used to analyze the joint likelihood of the observed words w with the unobserved label and topic assignments, $c_1$ and z, and s to account for shared versus global topics, respectively.

where, $\Psi = \{\theta^c, \theta^g, \phi^1\}$, $\alpha^c$=a proxy parameter trained from labeled linked documents. It should be noted that, during training, parameter $c_u$ is not proxy and require explicit modeling.

As discussed above, the model replaces count notations for documents with $n_{l,c,k,v,s=1}$ as the number of occurrences of word v with topic $k \in \{1 \ldots K_c\}$ that belongs to label c in document l. Similarly, $n_{l,g,k,v,s=0}$ as the number of occurrences of word v with topic $k \in \{1 \ldots K_g\}$ that belongs to shared type of topics in document l.

The model may also obtain the following Gibbs updates:
For s==0 for token i:

$$p(s_i = 0 | s_{-i}, z = k, \Psi) \propto \left(n^{(-l,i)}_{l,\ldots,s=0} + \omega\right) \frac{n^{(-l,i)}_{l,k,s=0} + \alpha^g}{n^{(-l,i)}_{l,\ldots,s=0} + K_g \cdot \alpha^c} \quad (7)$$

For s==1 for token i:

$$p(s_i = 0 | s_{-i}, z = k, c_i = c, \Psi) \propto \left(n^{(-l,i)}_{l,\ldots,s=1} + \omega\right) \frac{n^{(-l,i)}_{l,c,s=1} + \alpha^c}{n^{(-l,i)}_{l,\ldots,s=0} + K_c \cdot \alpha^c} \quad (8)$$

For $z_i$ for token i with $s_i$=0:

$$p(z_i = k | c_i = g, w_{-i}; c_{-i}, z_{-i}, \Psi) \propto \frac{n^{(-l,i)}_{l,\ldots,s=0}}{n^{(-l,i)}_{l,\ldots,s=0} + K_g \cdot \alpha^g} \cdot \frac{n^{-(l,i)}_{l,c,k,v} + \beta}{n^{-(l,i)}_{l,c,k,\ldots} + V \cdot \beta} \quad (9)$$

Similar updates for label specific topics can be obtained.

Given models 200(*a*) and 200(*b*) and the assumptions associated with the models, a generative process may be created. In one embodiment, an algorithm 1 is provided below that provides one way to implement a Gibbs sampling method giving the models 200(*a*) and 200(*b*) and to measure the assumptions of variables used. In one embodiment, the algorithm 1 may be represented as follows:

---

Algorithm 1: GENERATION SCHEME FOR uL-LDA

---

1  for each lable $c \in 1,..,C$ do
2  │  for each topic $k \in 1,..,K_c$ do
3  │  │  Generate label specific topic
   │  │  multinomial $\emptyset_{c,k} \sim \text{Dir}(.|\beta)$
4  for each topic $k \in 1,..,K_g$ do
5  │  Generate $\emptyset_{g,k} \sim \text{Dir}(.|\beta)$
6  for each user $u \in 1,..,U$ do
7  │  for each label $c \in 1,..,C$ do
8  │  │  Generate topic mixture for label c:
   │  │  │  $\theta_{u,c} \sim \text{Dir}(.|\alpha^u)$;
9  │  Generate label mixture for u:
   │  │  $c_u \sim \text{Dir}(.|\lambda)$;
10 │  for each micro-post $t \in 1,..,D_u$ do
11 │  │  Generate label of interest for t:
   │  │  │  $c_t \sim \text{Mult}(.|c_u)$;

-continued

Algorithm 1: GENERATION SCHEME FOR uL-LDA

```
12  |   |   Generate topic of interest for t:
    |   |   z_t ~ Mult(.|θ_{u,c}):
13  |   |   for each word w in 1, .., N_t do
14  |   |   |   Generate w ~ Mult(.|∅_{u,z_t});
15 for each document l ∈ 1, .., D_t do
16  |   Generate mixture variable over shared
    |   topics for l: θ_l^g ~ Dir(.|α^g);
17  |   Generate label c_l for l;
    |   c_l ~ Categorical(.|α^c);
18  |   Generate label specific topic mixture
    |   for l: θ_l^s ~ Dir(.|α^c);
19  |   Generate proportion of shared vs.
    |   class-specific topics in doc l:
    |   φt ~ Beta(.|ω);
20  |   for each position i in l, .., N_d do
21  |   |   Generate s ~ Bern(.|φl);
22  |   |   if s == 0 then
23  |   |   |   Sample a topic z from shared
    |   |   |   topic space: z ~ Mult(.|0_l^g);
24  |   |   |   Sample w ~ Mult(.|∅_{g,z});
25  |   |   else
26  |   |   |   Sample a topic z from
    |   |   |   label-specific topic space;
    |   |   |   z ~ Mult(.|θ_l^{ct});
27  |   |   |   Sample w ~ Mult(.|∅_{c,z});
```

In another embodiment, non-parametric statistics based techniques, such as Hierarchical Dirichlet Process (HDP) may be used to infer the appropriate size of topics. HDP does not pre-specify number of topics and learns through posterior inference. User-Labeled-HDP (uL-HDP) is an example generative model for a collection of labeled posts and is an extension of ul-LDA and HDP to incorporate modeling of labels, links content and user's latent topics.

The model assumes a global set of topics ø where each topic $ø_z$, indexed by topic indicator z, has a multinomial distribution over words w. For each user, U, the model further samples a per-user topic proportion $θ_u$ from the global level Dirichlet Process, i.e. $θ_u \sim DP(τ, α_u)$. To include supervision while modeling user posts, the model also assumes the existence of a set of labels C in a multi-label setting where each post can have multiple labels from set C labels (indexed by $c \in \{1, \ldots, C\}$). The model extends the topic word distribution, $θ_z$ to the label level and assigns each label c its own set of topics, i.e. one to one mapping between labels and topics: $θ_{z,c}$. In addition to user level topic mixture $θ_u$, the model introduces two more parameters: (i) user level label mixture, $c_u$ which has a Dirichlet prior $α_c$. $c_u$ represents the assumption that a typical user u is interested in a few of the global level labels and her posts should reflect her preference over labels. (ii) A global label-topic mixture φ, which indicate popularity of a topic in a label. φ signifies that, while generating posts about a label, users prefer popular topics, e.g. hurricanes for label weather.

Figure 3A:
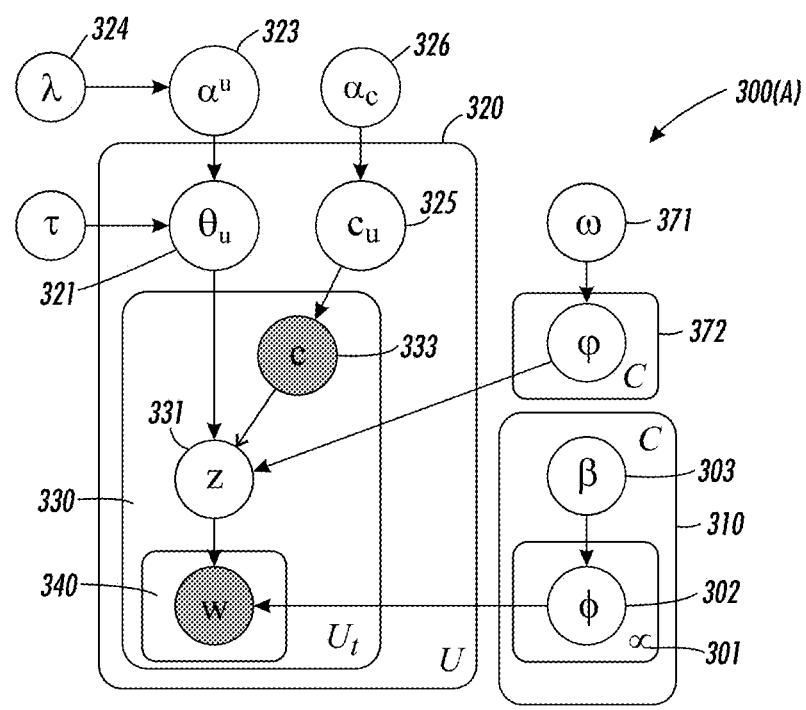
FIGS. 3A and 3B illustrate Bayesian graphical models and generative processes for embodiments of the $L^2$-HDP model, according to an embodiment.

FIG. 3A illustrates a Bayesian graphical model and generative process for embodiments of the uL-HDP model 300(a). In particular, referring to FIG. 3A, for each topic 301 (in a C label number of repetitions 310), a multinomial distribution $ø_z$ 302 is drawn from a symmetric Dirichlet prior β 303. Next, for each post $u_t$ 330 belonging to a user U 320, the following is performed. First, for each user U, a topic distribution $θ_u$ 321 is obtained by from the global level Dirichlet Process, i.e. $θ_u \sim DP(τ, α_u)$, where $α_u$ 323 is drawn from Dirichlet prior λ 324 Second, for each user U, a label mixture variable $c_u$ 325 is drawn from a symmetric Dirichlet prior $α_c$ 326.

A global label-topic mixture φ 372, which indicates popularity of a topic in a label C is also sampled using Dirichlet hyperparameter w 371.

Next, for each word position w 340 in the post $u_t$ 330, the following is performed. First, a topic z 331 is drawn from the label multinomial distribution $θ_u$ 331, corresponding to a label c 333 a label mixture variable $c_u$ 325, such that $z_t \sim θ_u$. Second, a topic is independently drawn from the popular topic multinomial distribution φ372, and finally a topic is sampled such that $z \sim θ_u \bigcirc φ_c$, where $\bigcirc$ represents element-wise product. Finally, words in post $u_t$ are repeatedly generated by sampling from topic distribution $φ_{z,c}$.

Similar, to the uL-LDP embodiment, the model then infers its parameters parameters $φ_{z,c}$, $φ_c$ from labeled tweets using direct assignment by Gibbs sampling and infers the topic assignments for words.

$$p(z_i = k \mid c_i = c, w_{-i}, c_{-i}, z_{-i}, \Psi) = (n_{c,-i}^u + α_c) \quad (10)$$

$$\frac{n_{v,c,-i}^z + β}{\sum_v n_{v,c,-i}^z + V.β} \times \frac{n_{c,-i+w}^z}{\sum_c n_{c,-i+C,w}^2} \times \begin{cases} (n_{z,-i+α_u}^u). & \text{for } z \text{ existing} \\ (τ * α_u) & \text{for } z \text{ new} \end{cases}$$

where, the subscript notation is used to indicate counts of observed assignments, i.e. n j/i is the number of times variable i is observed with variable j. Subscript $a_{-i}$ indicates exclusion of $i^{th}$ variable from vector a.

The above described uL-HDP algorithm is used for identifying topics and word distribution in labeled documents that do not include a link to external content. For documents, that include a link to external content, in an embodiment, the above algorithm may be modified as discussed below. Links to external content may indicate a user's strong interest towards the topic(s) contained in the linked content.

The User-Labeled-Linked-HDP ($L^2$-HDP) assumes that an "external corpus" of a collection liked documents (e.g., web pages) of size L exists and each post in the collection of posts can link to one or more linked documents from the external corpus. Mathematically, each linked document l may include a set of labels $c_l$ (e.g. politics, war), and a mixture of topics $θ_l$. For each word $w_{li}$, at location l, has an associated topic variable $z_{li}$, and corresponding label variable $c_l$. To generate a topic assignment $z_{li}$, $L^2$-HDP picks an existing topic within label $c_l$ for word $w_{li}$ in proportion to how often it is used, or generates a new topic with held-out mass parameter γ. Specifically, the topic mixture $θ_l$ is weighed with the popularity of topics in φ, i.e. $z \sim θ_l$, $\bigcirc φ_c$ where $\bigcirc$ represents element-wise product. The word $w_{li}$ is then generated according to the topic distribution $ø_{cl,zli}$ as in User-Labeled-LDA. For every "new" topic sampled, a new topic parameter over vocabulary V is sampled from symmetric Dirichlet distribution with hyperparameter β. Essentially, for each linked external web-document l, a coin biased with probability function is performed, given by link function $f_x(x_1) \mid z_u, z_l, c_l, c_t, γ)$. Finally, a match between the user's topic and label of interest with the label and topics in the external content is weighted, i.e. if $f_x(x_l=1) > f_x(x_l=0)$. The graphical model for the model is shown in FIG. 3B.

Figure 3B:
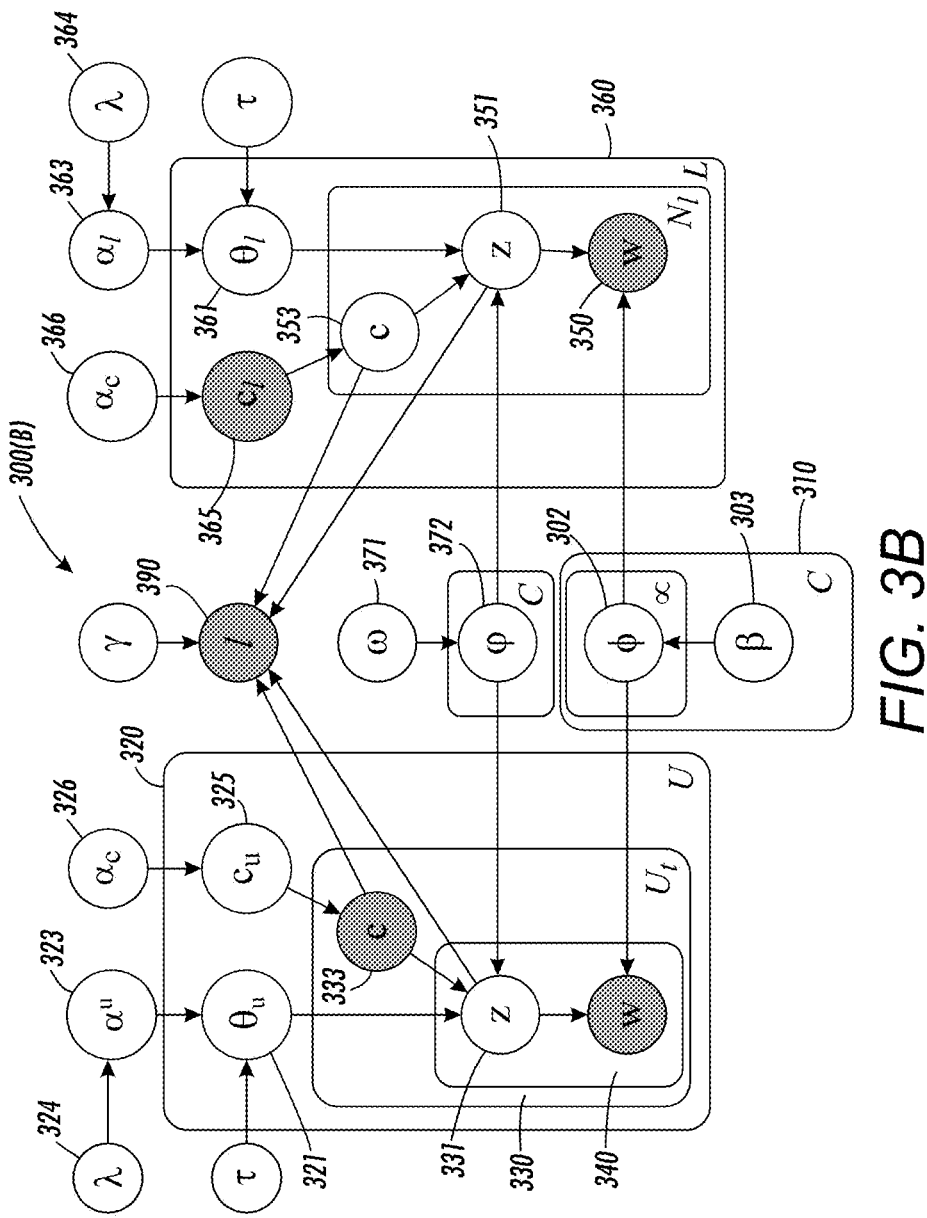

Referring now to FIG. 3B, which illustrates a Bayesian graphical model and generative process for embodiments of the $L^2$-HDP model 300(b), for each topic 301 (in a C label number of repetitions 310), a multinomial distribution $ø_z$ 302 is drawn from a symmetric Dirichlet prior β 303.

A global label-topic mixture φ 372, which indicates popularity of a topic in a label C is also sampled using Dirichlet hyperparameter ω 371.

Next, for each user post $u_t$ 330 belonging to a user U 320, the following is performed. First, for each user U, a topic distribution $\theta_u$ 321 is obtained by from the global level Dirichlet Process, i.e. $\theta_u \sim (DP(\tau, \alpha_u))$, where $\alpha_u$ 323 is drawn from Dirichlet prior $\lambda$ 324. Second, for each user U, a label mixture variable $c_u$ 325 is drawn from a symmetric Dirichlet prior $\alpha_c$ 326. Next, for each word position w 340 in the user post $u_t$ 330, the following is performed. First, a topic z 331 is drawn from the label multinomial distribution $\theta_u$ 321, corresponding to a label c 333 a label mixture variable $c_u$ 325, such that $z_t \sim \theta_u$. Second, a topic is independently drawn from the popular topic multinomial distribution $\varphi$ 372, and finally a topic is sampled such that $z \sim \theta_u \bigcirc \varphi_c$, where $\bigcirc$ represents element-wise product. Finally, words in post $u_t$ are repeatedly generated by sampling from topic distribution $\varphi_{z,c}$.

A similar process is performed for each word position w 350 in the linked document L 360. First, a topic z 351 is drawn from the label multinomial distribution $\theta_l$ 361 (obtained by from the global level Dirichlet Process, i.e. $\theta_l \sim (DP(\tau, \alpha_l))$, where $\alpha_l$ 363 is drawn from Dirichlet prior $\lambda$ 364), corresponding to a label c 353 drawn a label mixture variable $c_l$ 365 (drawn from a symmetric Dirichlet prior $\alpha_c$ 366), such that $z_l \sim \theta_l$. Second, a topic is independently drawn from the popular topic multinomial distribution $\varphi$ 372, and finally a topic is sampled such that $z \sim \theta_l \bigcirc \varphi_c$, where $\bigcirc$ represents element-wise product. Finally, words in document $u_l$ are repeatedly generated by sampling from topic distribution $\varphi_{z,c}$.

Finally, a link function 1390 is used to generate a coin biased probability to weigh a match between the topic distribution of the post-document with that of the linked document, to restrict the learning model to linked documents with at least one label similar to that of the user-post.

The $L^2$-HDP model generates the link function $f_X(.)$ as a exponential function:

$$f_X(x_{i,l}|Z_u, Z_l, C_l, C_t, \gamma) = \exp((\eta^T(Z_t \bigcirc z_l) + \mu)(\xi^T(c_t \bigcirc C_l))) \quad (11)$$

Here, the exponential link function represents a continuous and exponential increase in probability values for linked documents and user posts that contain similar topic words. The model is restricted to learning from only the links where the linked documents have at least one label in common with the user posts. The model further performs a Gibbs topic update similar to User-Labeled-HDP.

$$p(z_i = k \mid c_i = c, w_{-i}, c_{-i}, z_{-i}, \Psi) = \quad (12)$$

$$(n^u_{c,-i} + \alpha_c) \frac{n^z_{v,c,-i} + \beta}{\sum_v n^z_{v,c,-i} + V\beta} \times \frac{n^2_{c,-i+w}}{\sum_c n^2_{c,-i+C,w}}$$

$$\prod_{i,l} \int x(xi, l \mid z_u, z_l, c_t, c_l, \gamma) \times \begin{cases} (n^u_{z,-i+\alpha_u}) & \text{for } z \text{ existing} \\ \tau * \alpha_u) & \text{for } z \text{ new} \end{cases}$$

where, (I, below, represents indicator function)

$$\prod_l f_X(x_i, l \mid z_u, z_l, c_t, c_l, \gamma) \propto \exp\left(\frac{1}{N_t} n_k \sum_{l \mid \bigcap (c_l, c_t) \mid >0}^{l:x_t, l=1 \wedge} \frac{\xi_c \cdot N_{lk} \cdot N_{lc}}{N_l}\right) \quad (13)$$

Gibbs update for the link function:

$$f_X(x_i, l \mid z_u, z_l, c_t, c_t \gamma) = \exp((\eta^T(z_t \bigcirc z_l) + \mu)(\xi^T(c_t \bigcirc c_l))) =$$

$$\exp\left(\left(\frac{1}{N_t N_l} \sum_k \eta_k N_{tk} N_{lk} + \mu\right)\left(\frac{1}{N_t N_c} \sum_c \xi_c N_{tc} N_{lc}\right)\right)$$

$$f_X(x_i, l \mid z_u, z_l, c_t, c_t, \gamma) \propto \frac{f_X(x_i, l \mid z_u^{-i}, z_l, c_t, c_t, \gamma)}{f_X(x_i, l \mid z_u, z_l, c_t, c_t, \gamma)} = \frac{\exp(A)}{\exp(B)} \text{ where,}$$

$$A = \exp\left(\left(\frac{1}{N_t N_l} \sum_k \eta_k (N_{tk}^{-i} + I(z_i = k)) N_{lk} + \mu\left(\frac{1}{N_t N_c} \sum_c \xi_c (N_{tc}^{-i} + I(c_i = c)) N_{lc}\right)\right)\right)$$

and $$B = \exp\left(\left(\frac{1}{N_t N_l} \sum_k \eta_k N_{tk} N_{lk} + \mu\right)\left(\frac{1}{N_t N_c} \sum_c \xi_c N_{tc} N_{lc}\right)\right)$$

$$\frac{\exp(A)}{\exp(B)} \propto \exp\left(\left(\frac{1}{N_t N_l} \sum_k \eta_k N_{lk}\right)\left(\frac{1}{N_t N_c} \sum_c \xi_c N_{lc}\right)\right)$$

While the above described generative models are described using Gibbs sampling, it is provided as one example of a statistical sampling method that may be used and it will be understood to those skilled in the art that other appropriate sampling methods or algorithms are within the scope of the disclosure. Alternative sampling methods that may be used in lieu of Gibbs sampling include, for example, other Markov chain Monte Carlo methods including, but not limited to, various random walk Monte Carlo methods (e.g., Metropolis-Hastings algorithm, Slice sampling, Multiple-try Metropolis algorithm, and/or the like). Further, in some embodiments, various Bayesian inference techniques, such as, for example, variational Bayes approximation methods, expectation propagation, and/or the like may be used in addition to or in lieu of Gibbs sampling.

Referring back to FIG. 1, in step 105, the identified one or more topics associated with each of the labels from step 104 may be saved as training topic models.

FIG. 4A illustrates an example topic and word distribution (training topic model) obtained from training a user-labeled-LDA, from a collection of labeled posts (a subset of which include links to external posts), as discussed above. As shown in FIG. 4A, row 401 may include shared topic 401(a) and associated words 401(b). For example, topics such as browser and associated words such as cookies, page, site, etc. may be found under all labels. These shared topics may be shared across a plurality of labels. Rows 402, 403, 404, and 405 each represent a specific label and the label specific topics (402(a), 403(a), 404(a), and 405(a)) and words 402(b), 403(b), 404(b), and 405(b)). For example, for a label "politics," topics may include government, tax, wikileaks, etc. and each may have an associated distribution of words.

Similarly, FIG. 4B illustrates an example topic and word distribution obtained from training a user-labeled-HDP. Each row (401, 402, 403, and 404) represents a particular label, the associated topics (401(a), 402(a), 403(a), and 404(a)) and words (401(b), 402(b), 403(b), and 404(b)). The training topic model may also include the probability 410 of occurrence of each of the topics associated with each label.

Referring back to FIG. 1, the system may receive 106 a new post for classification. The new post may be unlabeled, and it may or may not include an external document link. A classifier module of the system may then use the identified topics and associated words (i.e., the trained topic model), for the labels, from trained topic models for each user to label 107 the new post. To do so, the classifier module may process the new post to extract a topic and/or words for the post. It may then consult the trained topic model to determine the appropriate label(s) for the extracted topic and/or words. The output of the classification and labeling may be saved 108 in association with the new post. The output of the classification and labeling may also be displayed to a user, via a user interface, in association with the new post.

Optionally, the system may analyze a collection of posts that are associated with a particular user or group of users to identify one or more topics of interest for that user or group of users 109. For example, each post may include or be associated with a user identifier, which is typically the user who published the post. The system may apply the trained topic model to identify those topics that appear in posts, externally linked documents, or with a specified frequency. The frequency may be a threshold number or percentage of the analyzed posts, a relative ranking (such as a threshold number of most frequently-appearing topics), or anther frequency measure. The frequency measure may optionally limited by a time period. When the system identifies one or more topics of interest to the user (or group of users) based on the content of the user's posts and/or external links, the system may save that information to a profile for the user(s) and use that information to provide the user with information that is relevant to the topic(s), such as news, advertisements, or other content.

For example, if the new unlabeled post includes the following post from a user: "Harry Potter movie tops the IMDB charts with 1.8 million viewers," the classifier module may extract keywords from the post such as harry, potter, and movie and consult the trained topic model to label the post as "entertainment". It should be noted that the post also includes some shared topic words such as movie and tops, which suggests that the post is associated with the topic "top movies".

In an embodiment, the new unlabeled post may be assigned more than one label. For example, for a post containing the following post from a user: "Government increases the budget for library funds in public schools," the classifier module may assign the post the labels of "politics" (based on the words "government" and "budget") and "education" (based on the words "library" and "schools").

In various embodiments, the training model may be user-indifferent, and generated simply for a collection of posts that are received from a particular microblog service, news feed and/or other source. In another embodiment, the system may develop specific training models for each user based on that user's posts. In an embodiment, the training model generated for each user may be static based on a fixed collection of posts. In another embodiment, the training model may be updated at fixed intervals of time to account for the change in user interest over time, using new labeled posts related to the user that may be retrieved in each time interval.

Figure 5:
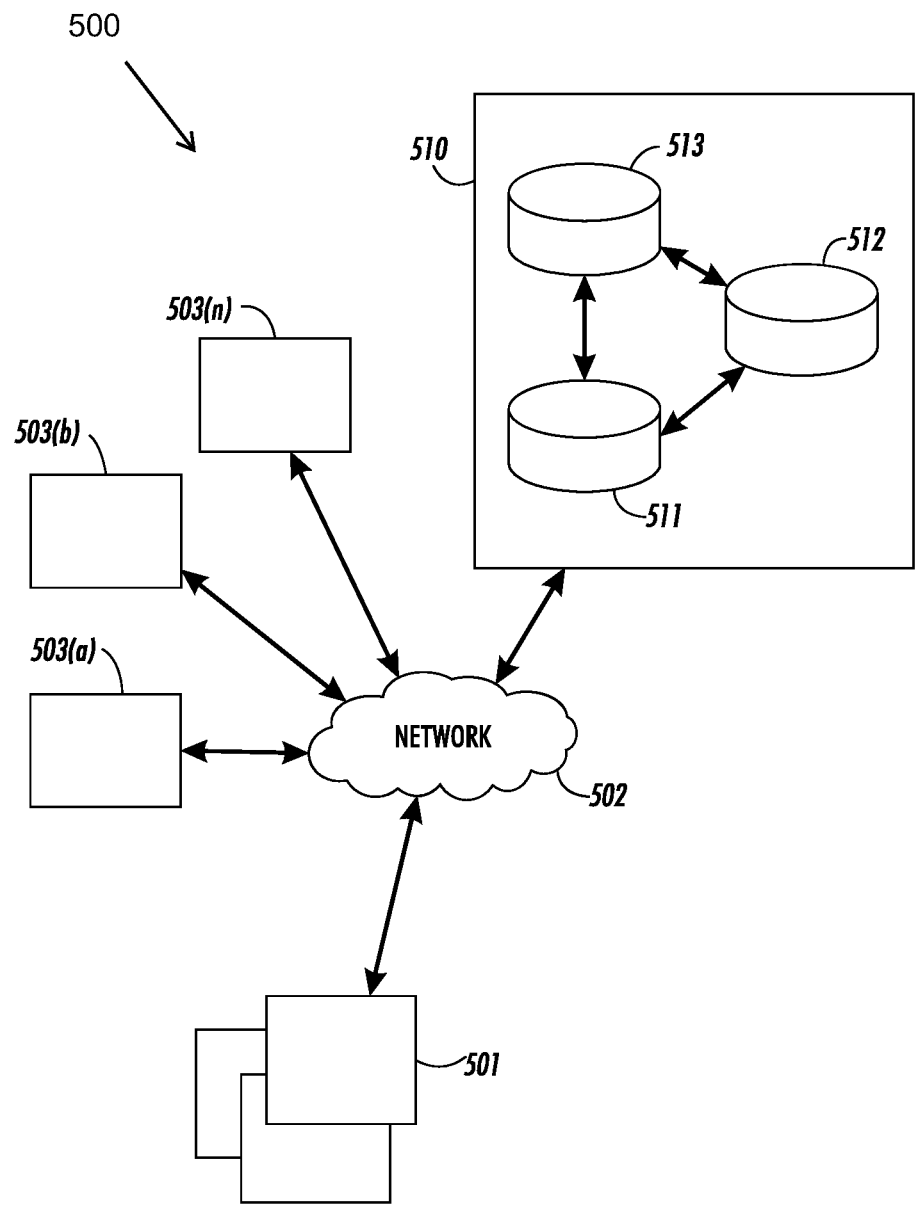
FIG. 5 represents a simplified-schematic block diagram of a system for generation of the topic training models and classification of unlabeled posts, according to an embodiment.

FIG. 5 illustrates a networked system 500 configured in accordance with an embodiment of the present invention. Referring to FIG. 5, the networked system 500 may include a plurality of messaging service (e.g., microblog and/or social networking service) servers 501 in communication (by wire or wirelessly) with each other and/or other services via a communication network 502. Examples of a communication network may include, without limitation, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks may also be used in conjunction with system 500 of FIG. 5 without departing from the scope of the present invention.

Each of the plurality of servers 501 may be a web server configured to offer a microblogging, social networking and/or similar messaging service, enabling users of send and read other users' posts or microblogs. The messaging servers 501 may access external linked documents 503(a), 503(b) . . . 503(n) (such as web pages or other documents) published on external services at addresses corresponding to the address of the link over the communication network 502 as well.

In an embodiment, a microblog classification system 510 may be in communication with each of the servers 501. The microblog classification system 510 may also access linked documents in microblog posts via the communication network 502.

In an embodiment, the microblog classification system may include an acquisition module 511, a generation module 512, and a classifier module 513. The various modules of the microblog classification system 510 may include any now or hereafter known software and/or hardware configuration, in which one or more processors execute programming instructions to provide the functions of the module. Each module may include its own processor(s), or the modules may share one or more processing devices.

System 500 is not to be limited in scope to any one particular network architecture.

Figure 6:
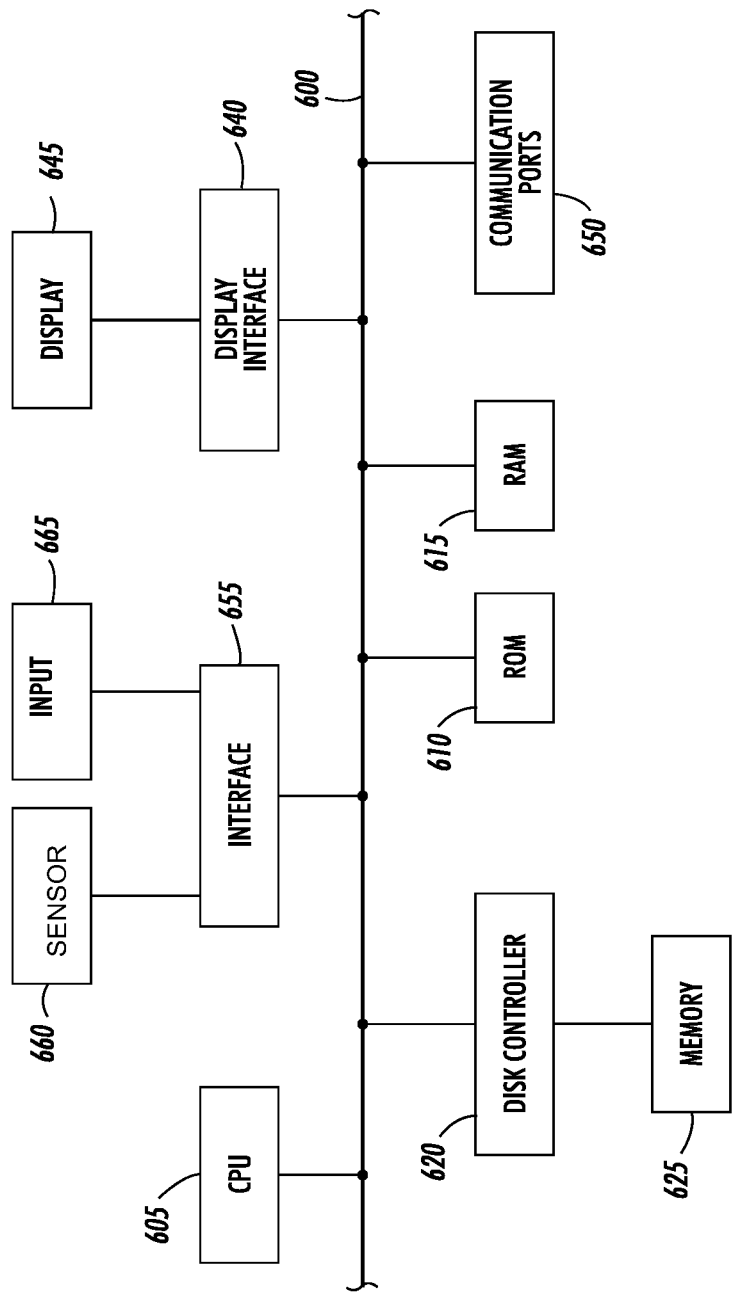
FIG. 6 depicts various embodiments of an electronic device for using the systems and processes described in this document.

The document classification method and process as described above may be performed and implemented by an operator of a mobile electronic device and/or a print device. FIG. 6 depicts an example of internal hardware that may be used to contain or implement the various computer processes and systems as discussed above. For example, the electronic device discussed above may include hardware such as that illustrated in FIG. 5. An electrical bus 600 serves as an information highway interconnecting the other illustrated components of the hardware. CPU 605 is a central processing unit of the system, performing calculations and logic operations required to execute a program. CPU 605, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 610 and random access memory (RAM) 615 constitute examples of memory devices. The term "memory device" and similar terms include single device embodiments, multiple devices that together store programming or data, or individual sectors of such devices.

A controller 620 interfaces with one or more optional memory devices 625 that service as date storage facilities to the system bus 600. These memory devices 625 may include, for example, an external or internal disk drive, a hard drive, flash memory, a USB drive or another type of device that serves as a data storage facility. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a non-transitory, computer readable medium such as a compact disk, a digital disk, flash memory, a memory card, a USB drive, an optical disc storage medium, and/or other recording medium.

An optional display interface 640 may permit information from the bus 600 to be displayed on the display 645 in audio, visual, graphic or alphanumeric format. Communication with external devices may occur using various communication ports 650. A communication port 650 includes communications hardware such as a transmitter and/or receiver, modem, or other communications interface hardware and may be attached to a communications network, such as the Internet, a local area network, wide area network, or a cellular telephone data network.

The hardware may also include an interface 655 which allows for receipt of data from input devices such as an imaging sensor 660 of a scanner or other input device 665 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for assigning a topic to a collection of microblog posts, the method comprising:
   receiving from at least one messaging service server, a plurality of posts, wherein:
      each of the plurality of posts comprise post content, and
      one or more of the posts comprise one or more links with an address to an external document;
   causing a communications hardware component to initiate a communication via a communications network that accesses the external document at an external server that is associated with the address and fetches external content associated with the external document; and
   by a generation module:
      analyzing the post content included in each post to identify at least one label for that post,
      for each post that includes a link, analyzing external content corresponding to the external document associated with that link to identify a topic, and
      using a topic modeling technique to generate a trained topic model, wherein the trained topic model comprises, for each identified label, a plurality of topics and a plurality of words associated with each of the plurality of topics; and
      saving the trained topic model to a computer-readable memory device,
   wherein, the topic modeling technique comprises a User-Labeled Linked Hierarchical Dirichlet Process ($L^2$-HDP) technique, that utilizes a user's interest variable vector to generate the trained topic model, wherein the user's interest variable vector is indicative of a topic composition of the set of documents associated with a user.

2. The method of claim 1, further comprising:
   receiving a new post associated with a user;
   by a classifier module:
      analyzing the new post by applying the trained topic model to a first plurality of words in the new post, and
      generating a label for the new post; and
   displaying the label, via a user interface.

3. The method of claim 1, wherein:
   each of the plurality of posts comprises a user identifier; and
   wherein the method further comprises identifying and outputting one or more topics of interest for a single user by:
      identifying a set of posts associated with the single user using an associated user identifier for the single user,
      using the set of posts for generating a user-specific trained topic model such that the user-specific trained topic model is associated with the single user, and
      using the user-specific trained topic model for identifying and outputting the one or more topics of interest for the single user.

4. The method of claim 1, further comprising identifying the topic for each post by analyzing the content of that post to identify the topic.

5. The method of claim 1, wherein the topic modeling technique comprises a User-Labeled Latent Dirichlet Allocation (uL-LDA) technique, that utilizes a user's interest variable vector to generate the trained topic model, wherein the user's interest variable vector is indicative of a topic composition of the set of documents associated with a user.

6. The method of claim 1, wherein the external document comprises a plurality of labels, and the plurality of topics in the trained topic model comprise a set of topics shared amongst the plurality of labels.

7. The method of claim 1, wherein the external document comprises a plurality of labels, and the $L^2$-HDP analyzes the external content corresponding to the external document associated with that link if the plurality of labels comprises at least label similar to the identified at least one label.

8. The method of claim 1, wherein the at least one label is selected from one of the following labels: a hashtag label, an emoticon-specific label, an @user label, a reply label, or a question label.

9. The method of claim 3, further comprising updating the user-specific trained topic model for the single user after a pre-determined time.

10. A system for assigning a topic to a collection of microblog posts, the system comprising:
   a processing device; and
   a computer-readable memory containing programming instructions that, when executed by the processing device, cause the processing device to:
      by an acquisition module, receive from at least one messaging service server, a plurality of posts, wherein:
         each of the plurality of posts comprise post content, and
         one or more of the posts comprise one or more links with an address to an external document;

by the acquisition module, cause a communications hardware component to initiate a communication via a communications network that accesses the external document at an external server that is associated with the address and fetches external content associated with the document;

by the generation module:
analyze the post content included in each post to identify at least one label for that post,
for each post that includes a link, analyze external content corresponding to the external document associated with that link to identify a topic, and
use a topic modeling technique to generate a trained topic model, wherein the trained topic model comprises, for each identified label, a plurality of topics and a plurality of words associated with each of the plurality of topics; and by the generation module, save the trained topic model to a computer-readable memory device wherein, the topic modeling technique comprises a User-Labeled Linked Hierarchical Dirichlet Process ($L^2$-HDP) technique, that utilizes a user's interest variable vector to generate the trained topic model, wherein the user's interest variable vector is indicative of a topic composition of the set of documents associated with a user.

11. The system of claim 10, further comprising programming instructions that, when executed by the processing device, cause the processing device to:
by the acquisition module, receive a new post associated with a user;
by a classifier module:
analyze the new post by applying the trained topic model to a first plurality of words in the new post, and
generate a label for the new post; and
display the label via a user interface.

12. The system of claim 10, wherein each of the plurality of posts comprises a user identifier; and wherein the system further comprises programming instructions that, when executed by the processing device, cause the processing device to identify and output one or more topics of interest for a single user by:
identifying a set of posts associated with the single user using an associated user identifier for the single user,
using the set of posts for generating a user-specific trained topic model such that the user-specific trained topic model is associated with the single user, and
using the user-specific trained topic model for identifying and outputting the one or more topics of interest for the single user.

13. The system of claim 10, further comprising programming instructions that, when executed by the processing device, cause the processing device to, by the generation module, identify the topic for each post by analyzing the content of that post to identify the topic.

14. The system of claim 10, wherein the topic modeling technique comprises a User-Labeled Latent Dirichlet Allocation (uL-LDA) technique, that utilizes a user's interest variable vector to generate the trained topic model, wherein the user's interest variable vector is indicative of a topic composition of the set of documents associated with a user.

15. The system of claim 10, wherein the external document comprises a plurality of labels, and the plurality of topics in the trained topic model comprise a set of topics shared amongst the plurality of labels.

16. The system of claim 10, wherein the external document comprises a plurality of labels, and the $L^2$-HDP analyzes the external content corresponding to the external document associated with that link if the plurality of labels comprises at least label similar to the identified at least one label.

17. The system of claim 10, wherein the at least one label is selected from one of the following labels: a hashtag label, an emoticon-specific label, an @user label, a reply label, or a question label.

18. The system of claim 12, further comprising programming instructions that, when executed by the processing device, cause the processing device to update the user-specific trained topic model for the single user after a pre-determined time.

* * * * *